(12) United States Patent
Trachsel

(10) Patent No.: US 10,717,331 B2
(45) Date of Patent: Jul. 21, 2020

(54) MEASURING DEVICE FOR MEASURING AN ARTICULATION ANGLE AND VEHICLE COMBINATION

(71) Applicant: SCHARMÜLLER GESELLSCHAFT M.B.H. & CO. KG, Fornach (AT)

(72) Inventor: Remo Trachsel, Mettmenstetten (CH)

(73) Assignee: SCHARMÜLLER GESELLSCHAFT M.B.H. & CO. KG, Fornach (AT)

( * ) Notice: Subject to any disclaimer, the term of this patent is extended or adjusted under 35 U.S.C. 154(b) by 0 days.

(21) Appl. No.: 16/461,861

(22) PCT Filed: Nov. 21, 2017

(86) PCT No.: PCT/EP2017/079890
§ 371 (c)(1),
(2) Date: May 17, 2019

(87) PCT Pub. No.: WO2018/095899
PCT Pub. Date: May 31, 2018

(65) Prior Publication Data
US 2019/0366786 A1 Dec. 5, 2019

(30) Foreign Application Priority Data
Nov. 23, 2016 (CH) ...................... 1552/16

(51) Int. Cl.
*B60D 1/30* (2006.01)
*B60D 1/58* (2006.01)
(Continued)

(52) U.S. Cl.
CPC ............ *B60D 1/30* (2013.01); *B60D 1/58* (2013.01); *G01B 7/30* (2013.01); *B60D 1/38* (2013.01)

(58) Field of Classification Search
CPC ... B60D 1/30; B60D 1/58; B60D 1/38; G01B 7/30
(Continued)

(56) References Cited

U.S. PATENT DOCUMENTS

| 2006/0071448 A1 | 4/2006 | Craig et al. |
| 2011/0018231 A1 | 1/2011 | Collenberg |

(Continued)

FOREIGN PATENT DOCUMENTS

| DE | 102009028000 A1 * | 1/2011 | ............... B60D 1/06 |
| DE | 102009028000 A1 | 1/2011 | |

(Continued)

OTHER PUBLICATIONS

European Patent Office, International Preliminary Report on Patentability issued in corresponding International Patent Application No. PCT/EP2017/079890 dated Mar. 1, 2019, and English-language translation. (22 pages).

(Continued)

*Primary Examiner* — Tony H Winner
*Assistant Examiner* — Felicia L. Brittman
(74) *Attorney, Agent, or Firm* — Liang & Hennessey; Brian E. Hennessey

(57) ABSTRACT

In a measuring device for measuring an articulation angle between a tractor vehicle which has a longitudinal axis, and a trailer which has a longitudinal axis, with a trailer coupling which trailer coupling includes a coupling ball, a ball receptacle which serves to receive the coupling ball, and at least one magnetic sensor it is proposed that the coupling ball have a ball opening, that a magnet be mounted in the ball opening, and that the ball receptacle have a recess, and that the at least one magnetic sensor be mounted in the recess, wherein changes in a magnetic field generated by the magnet are sensed by the magnetic sensor.

14 Claims, 6 Drawing Sheets

(51) Int. Cl.
*G01B 7/30* (2006.01)
*B60D 1/38* (2006.01)

(58) Field of Classification Search
USPC .......................................................... 280/511
See application file for complete search history.

(56) References Cited

U.S. PATENT DOCUMENTS

| | | | |
|---|---|---|---|
| 2013/0001924 A1* | 1/2013 | Adamczyk | B60D 1/065 |
| | | | 280/511 |
| 2014/0210456 A1 | 7/2014 | Crossman | |
| 2015/0165850 A1 | 6/2015 | Chiu et al. | |
| 2017/0136839 A1 | 5/2017 | Burkhart et al. | |

FOREIGN PATENT DOCUMENTS

| | | |
|---|---|---|
| DE | 102010054958 A1 | 6/2012 |
| EP | 2511110 A1 | 10/2012 |

OTHER PUBLICATIONS

Hungarian Patent Office, English language Search Report dated Sep. 13, 2017. (1 page).

\* cited by examiner

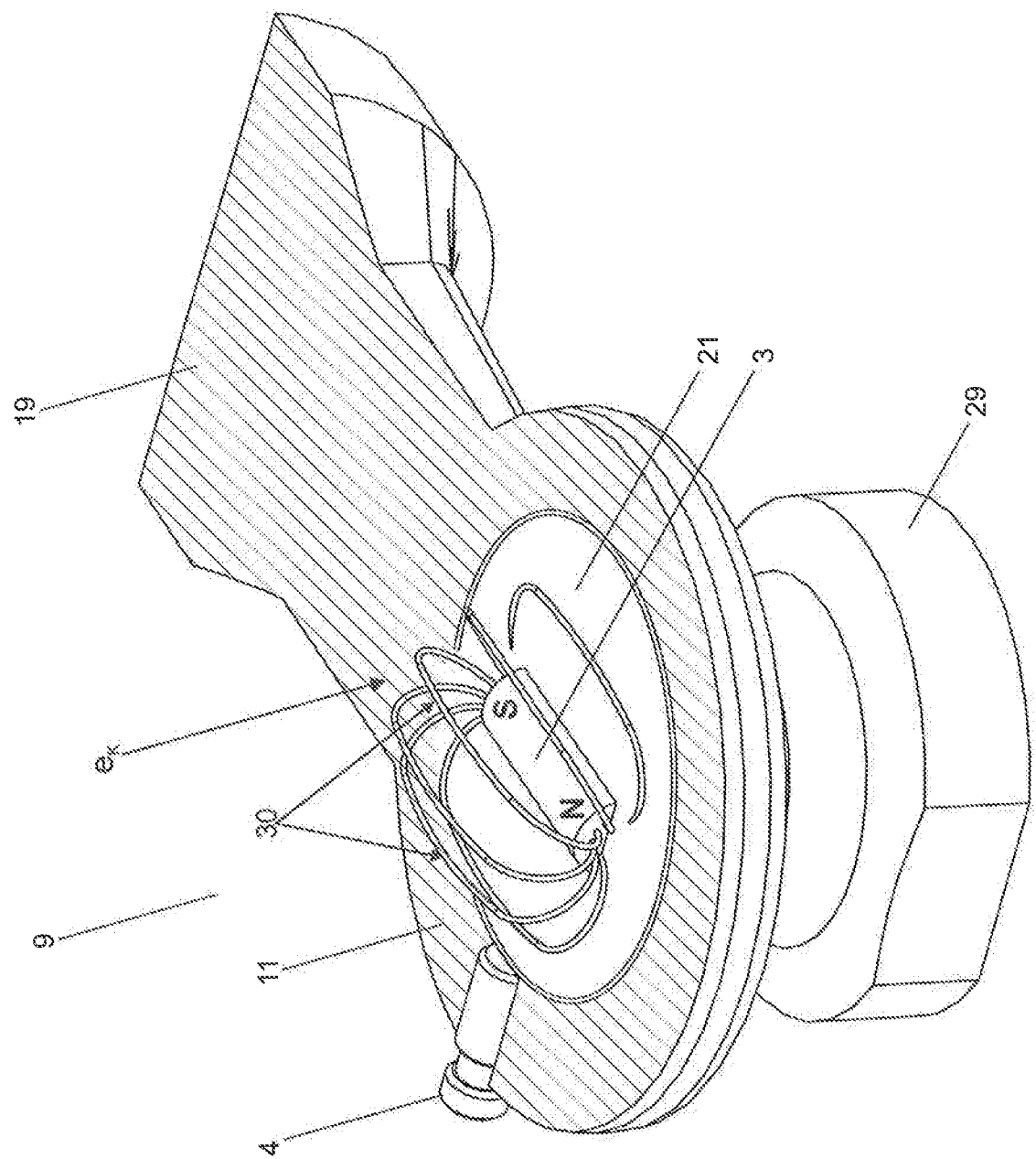

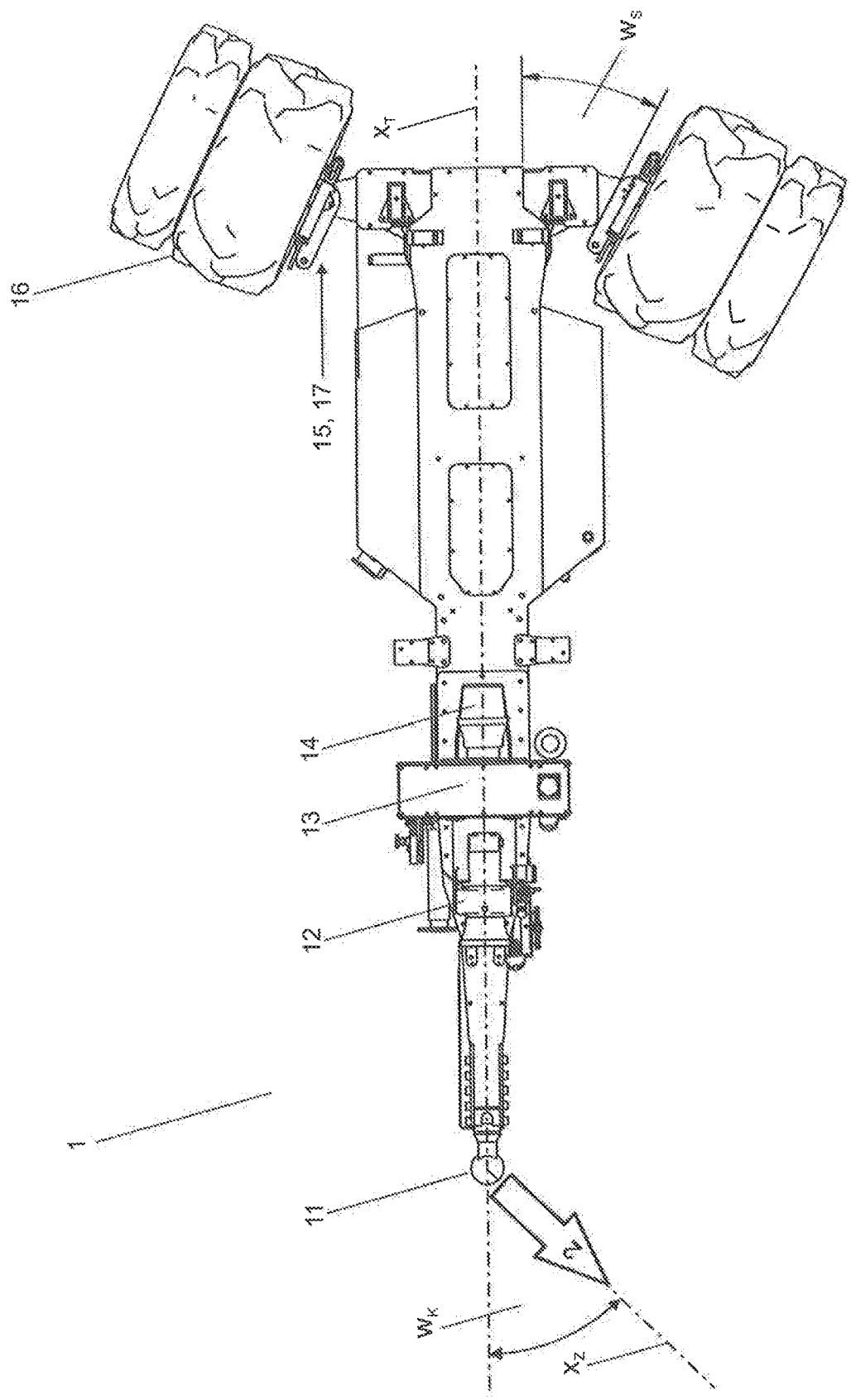

MEASURING DEVICE FOR MEASURING AN ARTICULATION ANGLE AND VEHICLE COMBINATION

CROSS-REFERENCE TO RELATED APPLICATIONS

The present application is a national phase application of PCT Application No. PCT/EP2017/079890, filed Nov. 21, 2017, entitled "MEASURING DEVICE FOR MEASURING AN ARTICULATION ANGLE AND VEHICLE COMBINATION", which claims the benefit of Swiss Patent Application No. A 01552/16, filed Nov. 23, 2016, each of which is incorporated by reference in its entirety.

BACKGROUND OF THE INVENTION

1. Field of the Invention

The invention relates to a device for measuring an articulation angle between a tractor vehicle and a trailer, as well as a vehicle combination that can be controlled depending on the measured articulation angle.

2. Description of the Related Art

It is known from DE102011113191A1 that it is often helpful to determine an articulation angle between a tractor vehicle and an associated trailer in the area of passenger cars as well as trucks. The articulation angle is determined by sensors integrated into a trailer coupling of the tractor vehicle.

EP2332750A1 discloses a trailer coupling for a tractor vehicle, in particular a passenger vehicle, for attaching a trailer to the tractor vehicle. The shown coupling device includes a ball carrier with a coupling ball, which is rotatably mounted in a coupling receptacle of a ball coupling of the trailer. Furthermore, a sensor arrangement is provided for measuring an articulation angle of the ball coupling with respect to the ball carrier, which sensor arrangement has a rotary entrainment device. The rotary entrainment device includes at least one rotary entrainment body which projects in front of the ball surface in a contact position and which is rotatably mounted relative to the ball surface and has a rotary entrainment surface which is configured as a frictionally engaged and/or positive-locking and/or force-locking rotary entrainment contact with the inner surface of the coupling receptacle.

The US 2006/0071448 A1 shows a device for measuring an articulation angle between a towing vehicle and a trailer as well as a vehicle combination of towing vehicle and trailer. Changes in the articulation angle are detected by means of magnetic field measurement. In this case, the sensors, in particular Hall sensors, are preferably arranged in a recess of the ball receptacle and the magnet in a ball opening of the coupling ball.

DE 10 2009 028 000 A1 shows a steering device for a trailer vehicle as well as a device for measuring an articulation angle between a towing vehicle and a trailer and a vehicle combination of towing vehicle and trailer.

US 2015/0165850 A1 shows a method and system for stability control of a towing vehicle and a trailer. The system includes at least one sensor, a calculation component, a control component and an actuator, or an actuator for the braking device.

The EP 2 511 110 A1 shows a trailer coupling with a sensor. Several magnets are arranged in an annular carrier body. The sensor detects the magnetic field changes of the magnets.

This sensor arrangement, which can detect an angle of rotation of the at least one rotary entrainment body relative to the ball carrier in one measuring plane, is elaborately designed and includes numerous wear-prone elements which may require maintenance. In addition, the angular deviation can only be detected by the ball carrier and thus only by the tractor vehicle. Furthermore, the contacting of the rotary entrainment body requires a precise production of the joint elements or the device parts of the trailer coupling. There is a danger that the rotary entrainment body will not be precisely tracked in the event of vibrations to the trailer coupling.

It should also be noted that water may penetrate into the measuring device along the rotatable rotary entrainment body and may damage the device parts. In addition, it must be ensured that the rotary entrainment body works perfectly in a wide temperature range, e.g. from minus 20° C. to plus 40° C., and that freezing water or moisture does not impair the measuring device, which is associated with corresponding effort.

Furthermore, tilting movements, i.e. mutual tilting of the tractor vehicle and the trailer, e.g. when driving over an undulating road without changing direction, or axial rotations, i.e. mutual rotation of the trailer and the tractor vehicle about a common longitudinal axis, e.g. when driving over a road with potholes, can influence the measurement. A tilting movement or axial rotation can therefore be falsely signaled as a change in angle, which otherwise only occurs when cornering.

DE102010045519A1 discloses a trailer coupling for a tractor vehicle comprising a coupling ball rotationally fixed to the tractor vehicle for the coupling of a coupling receptacle of a trailer as well as a coupling ring and a sensor. The coupling ring is rotatably mounted in a circumferential gap of the coupling ball such that it projects from the coupling ball, so that, by coupling the coupling receptacle to the coupling ball, the coupling ring is engaged with the coupling receptacle such that the coupling ring rotates relative to the coupling ball by an angle of rotation corresponding to a change in angle of articulation between the trailer and the tractor vehicle. The sensor is designed to measure this articulation angle.

This design of the trailer coupling also has the aforementioned disadvantages. In particular, the movable device parts have to be precisely manufactured and stored with corresponding effort. Tracking of the coupling ring is not guaranteed in the event of poor contacting, contamination or corrosion. The coupling ring can also jam if different torques act on it or if temperature expansions occur. If a change in the angle of rotation or articulation angle simultaneously results in a change in the angle of inclination or axial rotation, the coupling ring may optionally lock up, so that the change in the articulation angle cannot be detected. In addition, freezing wetness or moisture as well as penetrating dirt can block the coupling ring. Also in this case a relatively high maintenance expenditure results.

SUMMARY OF THE INVENTION

The present invention is therefore based on the object of providing an improved device for measuring an articulation angle between a tractor vehicle and a trailer. A vehicle combination shall also be provided which is controllable depending on the measured articulation angle.

The measuring device should be easy to set up and integrate into a trailer coupling with little effort and without requiring additional space. Increased precision in the manufacture of the device parts of the measuring device shall not be required. Determined measuring signals shall be easily feedable either to the tractor vehicle or to the trailer.

The measurement of the articulation angle or the angle of rotation between tractor vehicle and trailer can be carried with precision independently of any occurring tilting movements and rotations about the longitudinal axis. In particular, it shall be possible to measure the articulation angle precisely while shocks or vibrations act on the trailer coupling.

The measuring device is to be immune to external influences such as mechanical influences, temperature changes, corrosion or moisture. The measuring device is to be robust and maintenance-free.

The measuring device shall also provide reliable and interference-free signals without interruption, which can be advantageously processed to control the trailer.

By controlling the vehicle, in particular the trailer, its driving behavior is to be influenced advantageously. In particular, the aim is to increase directional stability and driving stability on level roads or in difficult terrain.

This object is solved by a measuring device and a vehicle combination which have the features specified in claims 1 and 13 respectively. Advantageous embodiments of the invention are indicated in further claims.

The measuring device for measuring an articulation angle between a tractor vehicle having a longitudinal axis and a trailer having a longitudinal axis includes a trailer coupling, which trailer coupling includes a coupling ball, a ball receptacle serving to receive the coupling ball and at least one magnetic sensor.

According to the invention, the coupling ball has a ball opening, wherein a magnet is mounted in the ball opening. The ball receptacle has a recess in which at least one magnetic sensor is mounted, wherein changes in a magnetic field generated by the magnet are detected by the magnetic sensor.

The magnet can especially preferably be a permanent magnet.

Alternatively, the magnet can be an electromagnet.

The measuring device according to the invention can be advantageously integrated completely into the trailer coupling. The measuring device does not require any contact between the device parts of the trailer coupling and the device parts of the measuring device, which is why these device parts are not subjected to any mechanical stress or wear. The device parts of the measuring device can also be placed in a tightly sealed manner in openings or recesses in the trailer coupling so that the measuring device is immune to the penetration of dirt or moisture. Furthermore, temperature expansions are absolutely uncritical. Contact elements can be completely dispensed with, which is why external influences on the measuring device are not critical. The measuring device according to the invention or the trailer coupling with this measuring device is therefore practically maintenance-free and free from malfunctions even under unfavorable operating conditions.

The measuring device delivers a continuous or stepless measuring signal which corresponds precisely to the size of the articulation angle. The measuring signal can therefore be used for control and regulation, wherein erratic and unsteady behavior is avoided. The required control or regulation can therefore be carried out practically without delay.

By means of commercially available magnetic sensors, especially Hall sensors, reliable and interference-free measuring signals can be obtained in a larger voltage range from e.g. 0V to 5V.

For example, a Hall sensor of type S12-AH-RGCD3 from Sensor Solutions Corporation, Steamboat Springs, Colorado, Colo. 80487, is used. This Hall sensor is operated with an operating voltage in the range from 8V to 30V and has a stainless steel housing with an external thread. The Hall sensor can therefore be screwed into a recess or receptacle opening. The Hall sensor provides an analog output signal which changes perpendicular to the front of the Hall sensor depending on the magnetic field strength. The output voltage is preferably proportional to the preferably regulated operating voltage. Magnetic fields between −1000 Gauss and +1000 Gauss are measurable. If no magnetic field is present, the Hall sensor supplies an output voltage of 2.5V. When field changes occur, the output voltage is changed by 2.5 mV per Gauss. The output voltage can therefore change between 0V and 5V depending on the magnitude and polarity of the applied magnetic field.

Instead of analog magnetic sensors or Hall sensors, magnetic sensors or Hall sensors can also be used which emit a digital output signal that preferably changes proportionally to the applied magnetic field. For example, the magnetic sensor can emit a pulse width modulated square wave signal whose duty cycle changes between the extremes. The magnetic sensor can also communicate wired or wirelessly with a control unit.

The ball opening used to hold the magnet is a bore, which passes through the coupling ball either completely or partially. A bore can therefore penetrate the coupling ball completely or partially. If the bore is only introduced into the coupling ball on one side, the magnet can be mounted more easily. If the ball opening or ball bore completely penetrates the coupling ball and is sealed on both sides with the same material, complete symmetry can be achieved during operation of the measuring device, i.e. the output signal of the magnetic sensor changes independently of the direction of rotation.

In particular, the bore may be cylindrical.

In particular, the magnet may be cylindrical.

Preferably the magnet has an external thread so that it can be screwed into the coupling ball up to an intended position or up to a stop. In this case, the ball opening is provided with a corresponding internal thread.

Alternatively or additionally, a filler, in particular a compound, a resin or an adhesive, can be provided inside the ball opening to hold the magnet and/or seal the ball opening on one or both sides. The filling material may also contain ferromagnetic elements.

The dimensions of the magnet, as well as its position within the ball opening, are chosen in particular in such a way that a space remains between the poles of the magnet and the outer surface of the coupling ball. The ends of the magnet can therefore be arranged to be spaced from the outer surface of the coupling ball. In particular, the dimensions of the magnet and its position within the ball opening are selected such that the magnetic field extends in the region of the air gap between the outer surface of the coupling ball and the inner surface of the ball receptacle and can be detected by the at least one magnetic sensor with a high field strength.

Two magnetic sensors can be provided in preferred embodiments, each of which is arranged in a recess in the ball receptacle.

In particular, the two magnetic sensors can be diametrically opposed on opposite sides of the magnet. The output signals of the two magnetic sensors can therefore be compared with each other to check the proper condition of the measuring device. For this purpose, the output signal of one of the magnetic sensors can be inverted, whereupon the difference between the output signals of the two magnetic sensors is compared with a threshold value. If this threshold value is exceeded, an alarm signal can be triggered which signals an irregularity, e.g. the failure of a magnetic sensor.

The two magnetic sensors can also include an angle of 90° so that different signals can be delivered.

The measuring device according to the invention makes it possible to obtain practically all the necessary information regarding the given articulation angle even in the simplest design with just one magnet and only one magnetic sensor. However, additional magnets and additional magnetic sensors can be used to precisely detect other movements of the trailer coupling in addition to the articulation angle. It is shown below that if the magnet and the magnetic sensor are suitably arranged, it is possible to obtain an output signal from the magnetic sensor for various movements of the trailer coupling device parts, which is practically exclusively dependent on changes in the articulation angle.

For this purpose, the magnet is aligned in a preferred embodiment with its longitudinal axis, which longitudinal axis extends between the magnetic poles of the magnet, parallel to the longitudinal axis of the vehicle, normally the tractor vehicle, to which vehicle the coupling ball is firmly connected in particular.

The magnet is preferably arranged such that the center point, preferably the magnetic center, of the magnet and the pivot center point of the trailer coupling which defines a center of rotation have at least approximately the same position. This ensures that changes in the output voltage of the magnetic sensor are largely proportional to changes in the articulation angle.

In order to ensure that the field lines of the magnetic field generated by the magnet extend essentially outside the coupling ball, it is preferably made of a diamagnetic or paramagnetic material. Preferably a material is used whose permeability number μr is less than 10, especially preferably less than 1.

The coupling ball is preferably made of stainless steel. For example, material is used that is also used to manufacture the housing of the magnetic sensor. The stainless steel can be in particular a chromium-nickel alloy.

The ball receptacle can be made of the same material as the coupling ball or of conventional materials. Thus, conventional ball receptacles can be used.

For optimum determination of the articulation angle, the ball receptacle preferably has a recess whose longitudinal axis, and thus the longitudinal axis of the magnetic sensor, is aligned radially to the center of the coupling ball, to the magnetic center of the magnet or to the pivot center of the trailer coupling and perpendicular to the longitudinal axis of the magnet.

In particular, the recess may be cylindrical.

The at least one magnetic sensor is particularly preferably arranged in such a way that the magnetic sensor is at least approximately equidistant from both poles of the magnet when the longitudinal axes of the tractor vehicle and the trailer are aligned coaxially. The magnetic sensor can then be arranged lying within the equatorial plane of the magnet in particular. With this arrangement of the magnetic sensor and the alignment of the magnet coaxial to the longitudinal axis of the trailer or tractor vehicle connected to it, the magnetic sensor lies exactly at the equator of the magnetic field in the absence of an articulation angle. When the magnet rotates and the coupling ball rotates accordingly, the magnetic sensor therefore runs along the equator of the magnetic field without detecting any change in it. If, on the other hand, the magnet and with it the coupling ball are rotated in a plane perpendicular to the longitudinal axis or measuring axis of the magnetic sensor, the measuring sensor remains at the same position on the equator of the magnetic field, which is why no change in field is detected in this case either. With this preferred embodiment of the measuring device or the trailer coupling designed in accordance with the invention, the coupling ball and the ball receptacle can thus be turned against each other in two different planes without the output signal of the magnetic sensor changing.

In vehicle combination according to the invention, comprising a tractor vehicle and a trailer which is equipped with a measuring device according to the invention, a control unit is provided which is connected to the at least one magnetic sensor and in which the output signals of the magnetic sensor are processed using a control program in order to drive at least one actuator which is coupled via a transmission unit to the wheels of the tractor vehicle and/or trailer and/or devices connected thereto as a function of the measured articulation angle. Depending on the measured articulation angle, the driving behavior of the vehicle can therefore be influenced advantageously.

In a preferred embodiment, in particular of the trailer, at least one pair of the wheels of the tractor vehicle and/or trailer is steerably suspended and controllable by means of the at least one actuator.

In particular, the angle of rotation of the wheels can be controlled by means of the control program as a function of the measured articulation angle corresponding to at least one target value, in particular designed as a proportionality factor or control curve, in such a way that the wheels of the trailer and the wheels of the tractor vehicle run in a track or the vehicle is held in a provided track.

In a further preferred embodiment, at least one of the wheels of the trailer is assigned an individually actuatable braking device, wherein the braking device is controllable by means of the at least one actuator. This can stabilize the trailer and reduce the articulation angle if necessary.

In particular, the braking device can be controlled by means of the control program as a function of the measured articulation angle corresponding to at least one target value, in particular designed as a proportionality factor or control curve, in such a way that a deflection in the direction of the controlled wheel is counteracted.

The driving behavior of the vehicle combination can therefore be optimized and stabilized by means of the measuring device and the associated control device according to the invention.

BRIEF DESCRIPTION OF THE DRAWINGS

In the following, the invention is explained in more detail by reference to the drawings, wherein:

FIG. 3c shows a cross-section through the measuring device and the trailer coupling 9 along the intersection line C--C of FIG. 1a with a view to a rotation plane eK in which the coupling ball 21 is rotatable with respect to the ball receptacle 11, wherein the distance between the poles S, N of the magnet 3 and the magnetic sensor 4 changes and the articulation angle resulting from the rotation can be detected; and FIG. 4 shows the trailer 1 and the tractor vehicle 2 of FIG. 1c shown schematically as an arrow, which trailer and tractor vehicle enclose an articulation angle wK with their longitudinal axes xT and xZ.

DETAILED DESCRIPTION

Figure 1A:
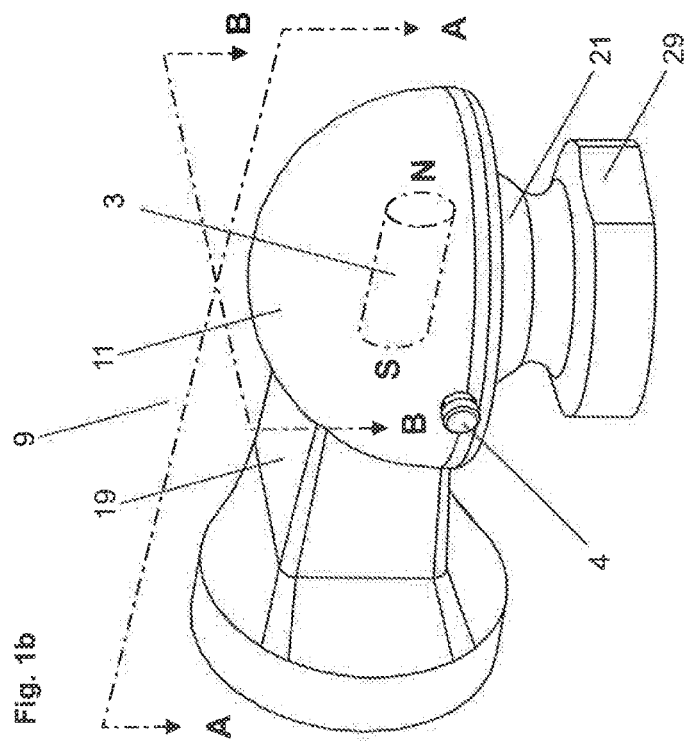
FIG. 1a shows a measuring device according to the invention for measuring an articulation angle with a trailer coupling 9 comprising a coupling ball 21 and a ball receptacle 11.

FIG. 1a shows a measuring device according to the invention for measuring an articulation angle with a trailer coupling 9, which includes a coupling ball 21 held by a ball carrier 29 and a ball receptacle 11 held by a receptacle carrier 19. Trailer couplings 9 of this type, which are manufactured, for example, by Scharmüller GmbH & CoKG, AT-4892 Fornach, e.g. the trailer coupling K 80, allow any tractor vehicle and trailer to be connected in an articulated manner.

Figure 1B:
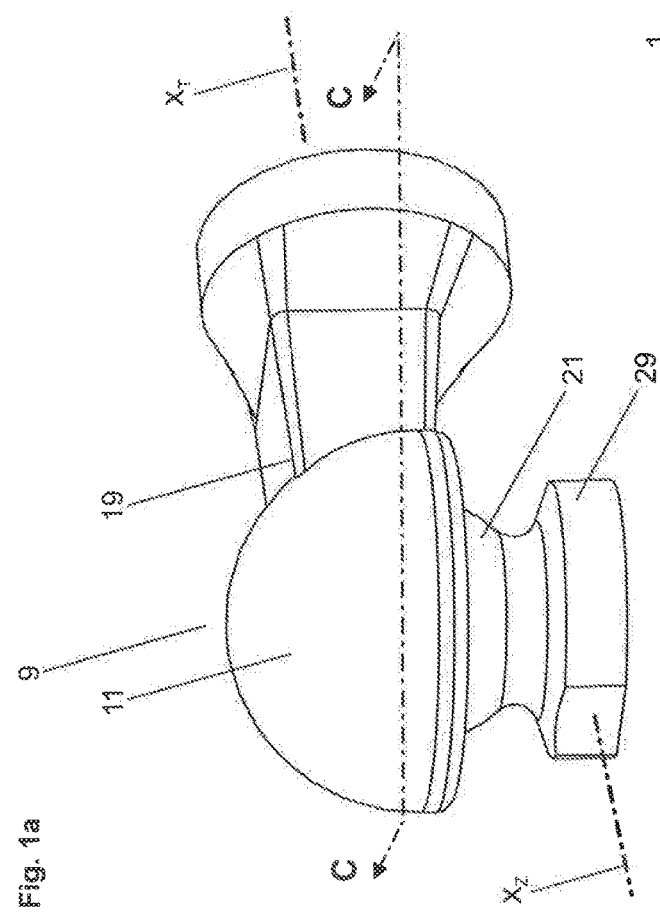
FIG. 1b shows the device of FIG. 1a illustrated from the other side with a magnetic sensor 4, by means of which changes of a magnetic field are measurable during the rotation of the coupling ball 21, which magnetic field is generated by a magnet 3 (see FIG. 3a), which is embedded in the coupling ball 21.

FIG. 1b shows the device of FIG. 1a from the other side with a magnetic sensor 4 inserted into the coupling receptacle 11, by means of which changes of the magnetic field can be measured during the rotation of the coupling ball 21 or the ball receptacle 11, which is generated by a schematically shown magnet 3 embedded in the coupling ball 21. The magnetic sensor 4, which is held in a recess 10 of the ball receptacle 11, as shown as an example in FIG. 3b, is a Hall sensor of the above mentioned type S12-AH-RGCD3, for example.

Figure 1C:
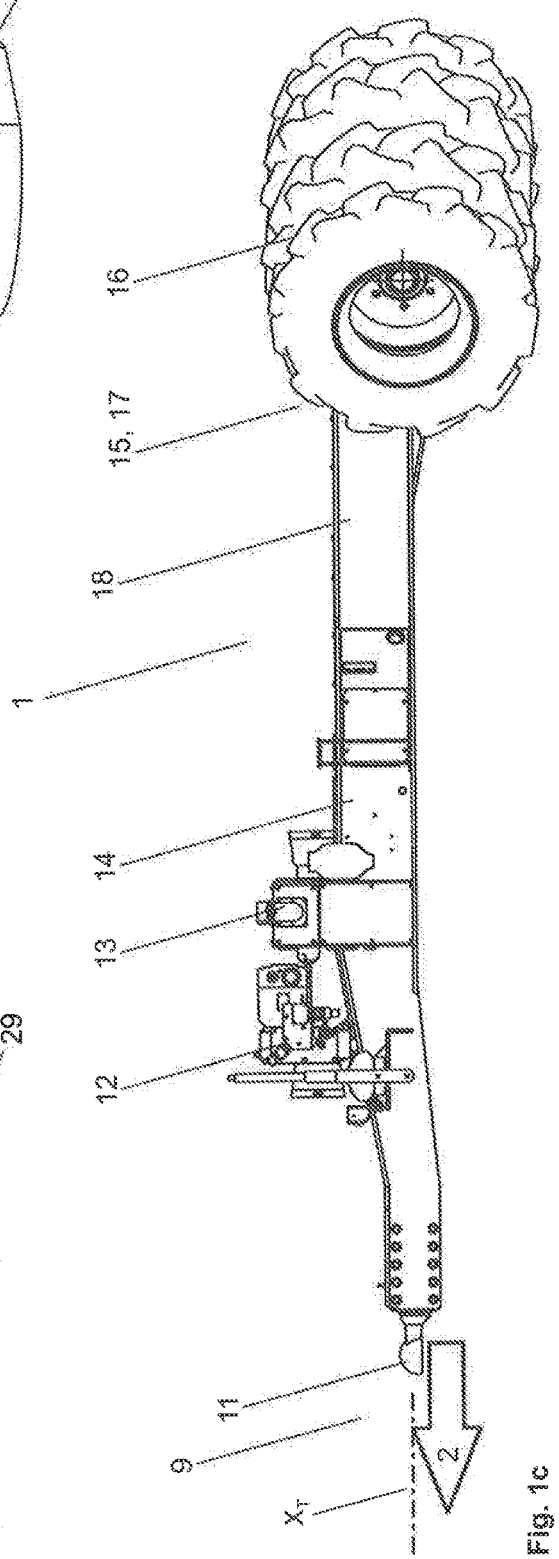
FIG. 1c shows a trailer 1 according to the invention, which is connected via a trailer coupling 9 according to FIG. 1a to a tractor vehicle 2 shown schematically as an arrow.

As shown in FIG. 1c and FIG. 4, for example, the ball receptacle 11 is rigidly connected to a trailer 1 and the coupling ball 21 with the ball carrier 29 is rigidly connected to the tractor vehicle. The longitudinal axes xZ and xT of tractor vehicle 2 and trailer 1, which are at least approximately coaxial with each other when the vehicle combination travels along a flat and straight road, are shown. When driving along a flat road but along a curve, only the articulation angle wK changes according to the curve radius, as shown in FIG. 4. This means that the parts of the trailer coupling 9 are rotated within a horizontal plane. When driving along a straight road whose gradient changes, the angle of inclination changes, i.e. the parts of the trailer coupling 9 are twisted in a vertical plane. When driving on a straight road without gradient changes, but with alternating unevenness, e.g. potholes, the parts of the trailer coupling 9 may rotate axially in some cases. The described rotations of the trailer coupling 9 often occur in combination.

In the preferred embodiment of the measuring device according to the invention shown here, changes in the magnetic field are only generated if there is a change in the articulation angle of the trailer coupling. The magnetic sensor and its output signal are not affected by any rotations of the trailer coupling about its longitudinal axis or by any mutual inclination of the parts of the trailer coupling in the event of a change in inclination. These movements which are not taken into account in the measurement can, however, be detected in a similar way using additionally installed magnets 3 and magnetic sensors 4, if desired.

The measured articulation angle or the output signal of the magnetic sensor 4 can be advantageously evaluated and used in various ways in tractor vehicle 2 or in trailer 1. In the tractor vehicle, for example, abnormal changes in the articulation angle can be displayed, e.g. to signal an undesirable driving behavior to the driver on a display. In trailer 1, the output signal of the magnetic sensor 4 can be used to control the wheels 16 according to the measured articulation angle wK. As shown in FIG. 4, the two wheels of trailer 1 are rotated by a steering angle wS. With this control, trailer 1 exactly follows the track of the tractor vehicle. In particular, if there are excessive changes in the articulation angle wK, the brakes, which are individually assigned to the wheels 16, can also be acted on advantageously.

Figure 2:
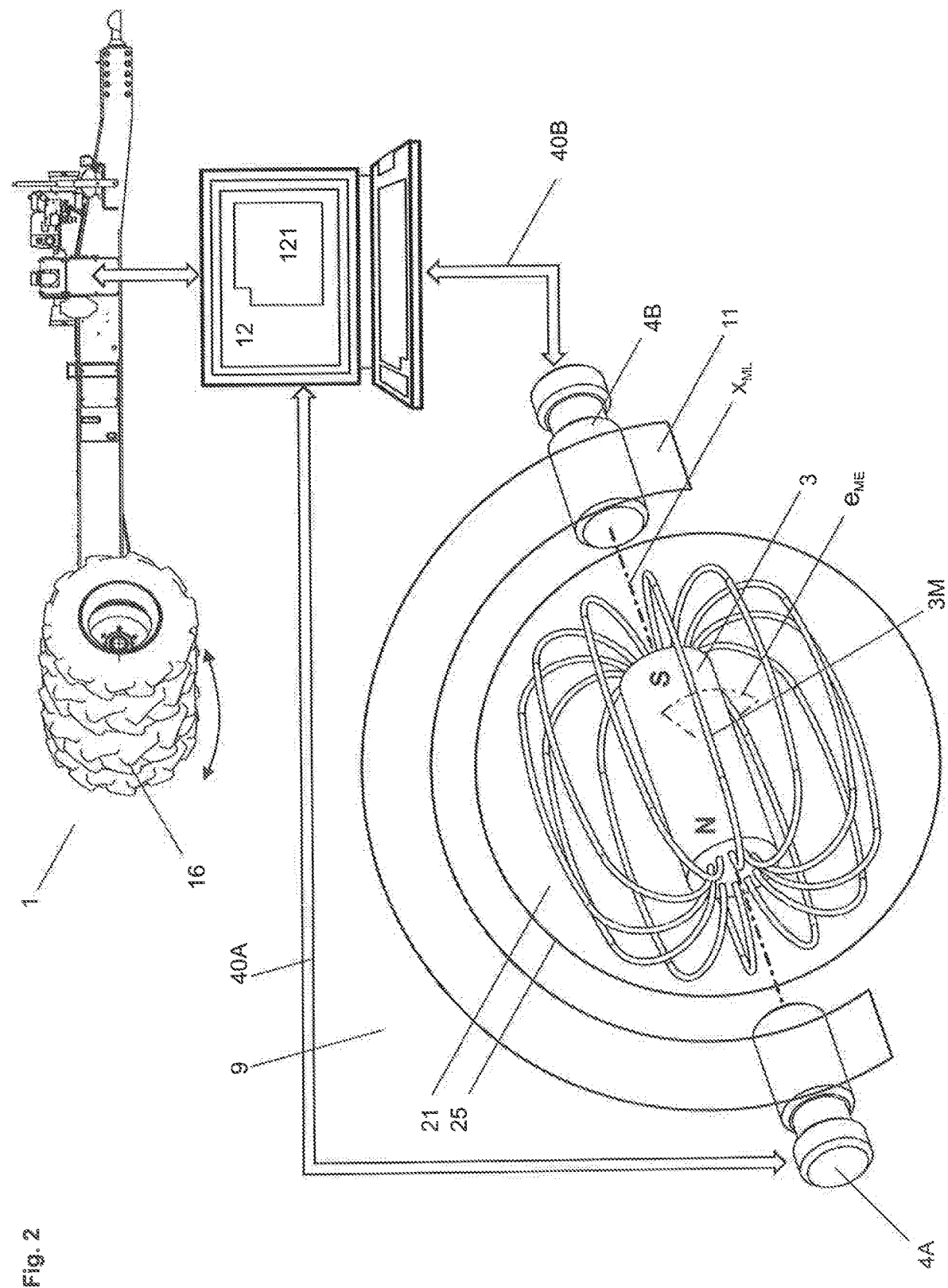
FIG. 2 shows the measuring device of FIG. 1a schematically illustrated in a preferred embodiment with the coupling ball 21, in which a cylindrical magnet 3 is arranged, and with the ball receptacle 11, in which optionally two magnetic sensors 4A, 4B are arranged, the output signals of which are transmitted to a control device 12 of the trailer 1.

For this purpose, a control device 12, in which the output signal of the magnetic sensor 4 is processed by means of an application program 121, as shown for example in FIG. 2, and corresponding control signals are output to at least one actuator or actuator 13, which acts via transmission lines 14, electrical or hydraulic lines or rod assemblies on mechanical or electrical devices which are provided for individual or paired braking or control of the wheels, is provided for this purpose in trailer 1 on a chassis 18. As mentioned above, the solution according to the invention can be used with different vehicles that have different technical systems that can preferably be influenced as a function of the measured articulation angle.

FIG. 2 shows the measuring device of FIG. 1a in a schematic representation with the coupling ball 21, in which a cylindrical magnet 3 is arranged, and with the ball receptacle 11, in which optionally two magnetic sensors 4A, 4B are arranged, the output signals of which are transmitted via measuring lines 40A, 40B to the control device 12 of the trailer 1. By using two magnetic sensors 4A, 4B the measurement of the articulation angle wK is redundant. If one magnetic sensor 4A or 4B fails, the output signals of the other sensor 4B or 4A can be used. It is also advantageous to compare the output signals of both magnetic sensors 4A, 4B in order to check the condition of the measuring device.

It is shown that the magnet 3 is formed cylindrically and has two poles S, N which are pierced by the longitudinal axis xML of the magnet 3. The equatorial plane eME of the magnetic field, which runs perpendicular to the longitudinal axis xML of magnet 3 and through the center 3M between the two poles S, N of magnet 3, is also indicated.

The longitudinal axis xML of the magnet 3 extends coaxially to the longitudinal axes of the cylindrical magnetic sensors 4A, 4B at the given articulation angle. The first magnetic sensor 4A delivers a voltage of 5V and the second magnetic sensor 4B delivers a voltage of 0V. This alignment of the magnet 3 preferably occurs after mutual rotation of the coupling ball 21 and the ball receptacle 11 by 90°.

Figure 3A:
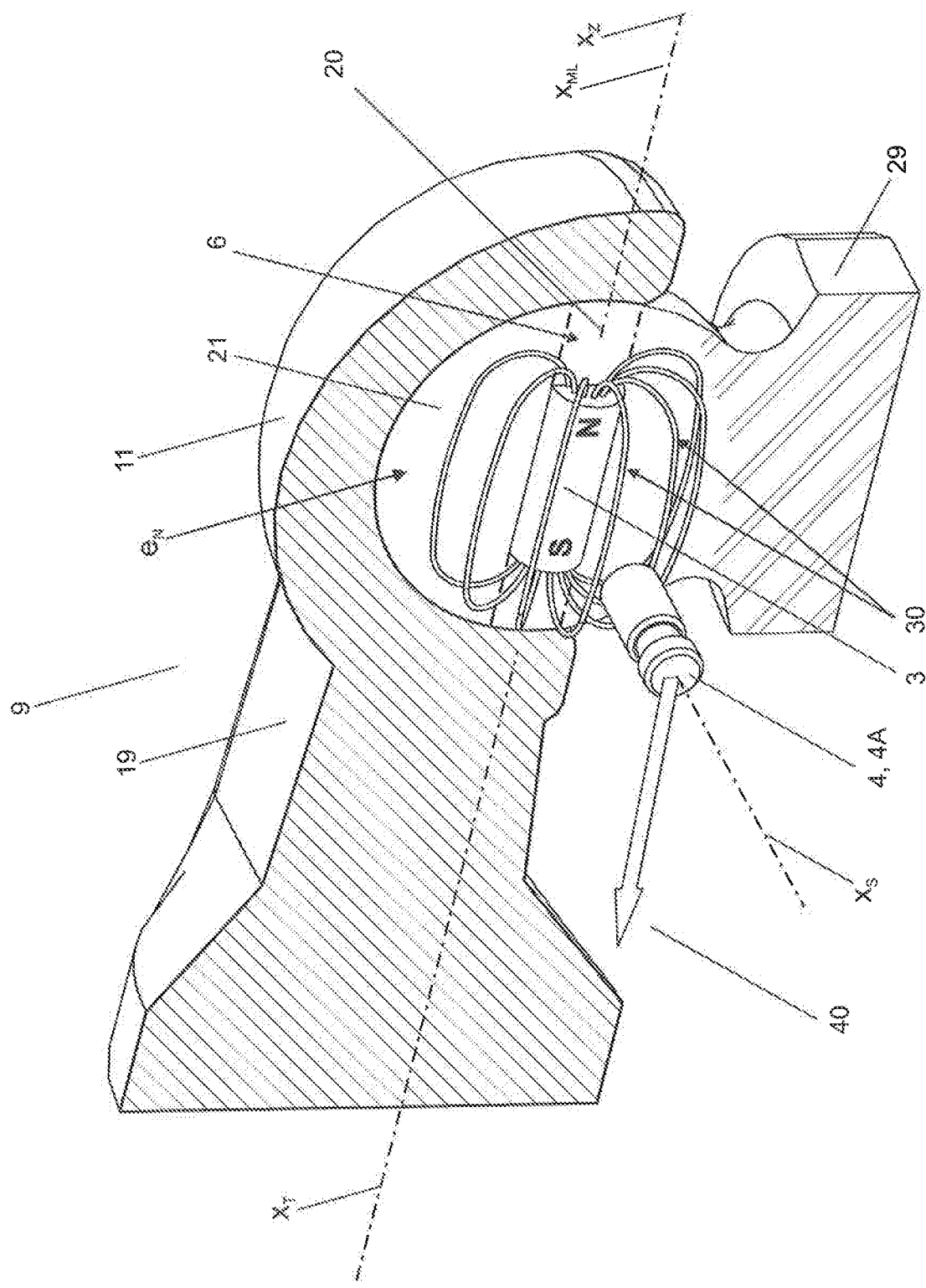
FIG. 3a shows a longitudinal section through the measuring device and the trailer coupling 9 along the intersection line A--A of FIG. 1b with a view to an inclination plane eN in which the coupling ball 21 is rotatable relative to the ball receptacle 11 without changing the distance between the poles S, N of the magnet 3 and the magnetic sensor 4.
Figure 3B:
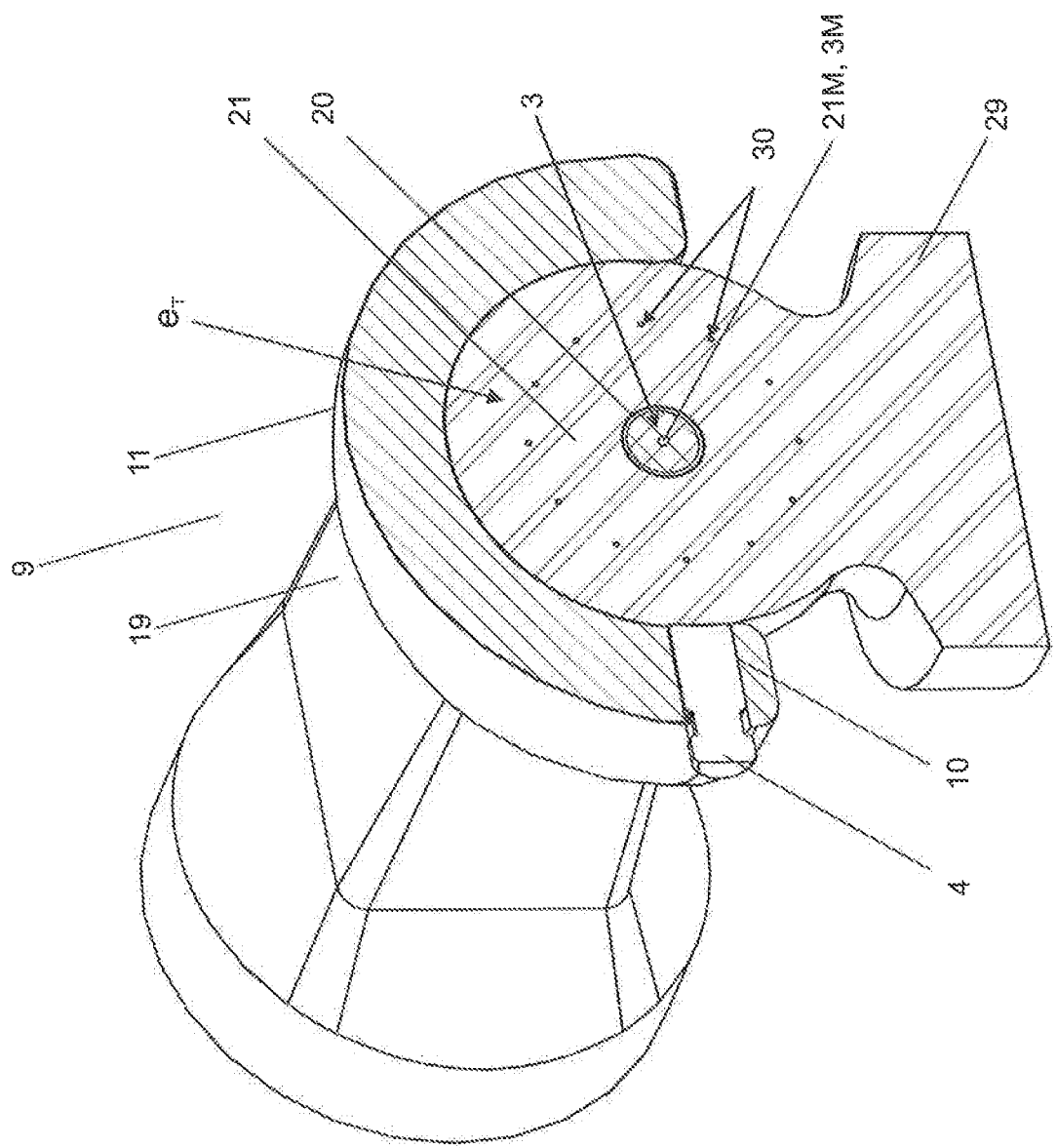
FIG. 3b shows a cross-section through the measuring device and the trailer coupling 9 along the intersection line B--B of FIG. 1b with a view to a torsion plane eT, in which the coupling ball 21 is rotatable relative to the ball receptacle 11 without changing the distance between the poles S, N of the magnet 3 and the magnetic sensor 4.

In FIGS. 3a, 3b and 3c, in which the coupling ball 21 and the ball receptacle 11 are shown in section, the longitudinal axes xZ and xT of tractor vehicle 2 and trailer 1 are aligned coaxially to each other.

FIG. 3a shows a longitudinal section through the measuring device and the trailer coupling 9 along the intersection line A--A of FIG. 1b with a view to an inclination plane eN, in which the coupling ball 21 is rotatable relative to the ball receptacle 11 without changing the distance between the poles S, N of the magnet 3 and the magnetic sensor 4.

FIG. 3a shows that the coupling ball 21 has a cylindrical ball opening 20 in which the cylindrical magnet 3 is mounted. The ball opening 20 is a bore which passes through the coupling ball 21 completely or partially. If the ball opening 20 is closed on one side, the magnet 3 can be pushed into the coupling ball 21 up to a stop. If the ball opening 20 completely penetrates the coupling ball 21, the magnet 3 is preferably pushed in until the center of the magnet 3 lies at the center of the coupling ball 21. As mentioned above, the magnet 3 and the ball opening 20 can be provided with threaded elements that allow the magnet 3 to be screwed into a desired position. Alternatively or additionally, the remaining space next to the poles S, N of magnet 3 can be filled with a filler 6, such as a casting compound, a resin or an adhesive, to fix magnet 3 and seal the ball opening 20 tightly on one or both sides.

As this is shown, a magnet 3 is preferably selected, which does not fully fill the ball opening 20 in the direction of the longitudinal axis. This prevents the field lines 30 of the magnetic field from entering deep into the metal ball receptacle 11 and the magnetic field from being changed undesirably. Preferably it is also prevented that the field lines 30 of the magnetic field within the coupling ball 21 are short-circuited and cannot emerge from the coupling ball 21. The coupling ball 21 is preferably made of a diamagnetic or paramagnetic material with a low permeability value µr.

The magnet 3 is embedded in the coupling ball 21 in such a way that its longitudinal axis xML extends coaxially or axially parallel to the longitudinal axis xZ of the tractor vehicle 2. The magnetic sensor 4 is aligned with its longitudinal axis xS perpendicularly to the longitudinal axis xML of the magnet 3. Preferably, the longitudinal axis xS or measuring axis of the magnetic sensor 4 lies in the equatorial plane eME of the magnet 3 and runs through its magnetic center 3M, as shown by way of example in FIG. 2.

In this center position, the Hall sensor 4 used in this case delivers a center voltage of 2.5V via a sensor cable 40. If the coupling ball 21 is rotated in the intersection plane or the inclination plane eN relative to the ball receptacle 11, the magnetic sensor 4 remains aligned to the same equator point. The output voltage of the magnetic sensor 4 therefore does not change during this rotation. If the coupling ball 21 is rotated with the magnet 3 about the common longitudinal axis xML or xZ, the magnetic sensor 4 extends along the equator of the magnetic field, which is why in this case too there is no change in the output voltage of the magnetic sensor 4.

FIG. 3b shows a cross-section through the measuring device and the trailer coupling 9 along the intersection line B--B of FIG. 1b with a view to a torsion plane eT, in which the coupling ball 21 can be rotated relative to the ball receptacle 11 without changing the distance between the poles S, N of the magnet 3 and the magnetic sensor 4. If the coupling ball 21 is rotated with the magnet 3 about the common longitudinal axis xML or xZ, or if the coupling ball 21 is rotated in the torsion plane eT relative to the ball receptacle 11, the magnetic sensor 4 extends along the equator of the magnetic field, which is why in this case also no field change is detected and no change in the output voltage of the magnetic sensor 4 occurs.

FIG. 3c shows a cross-section through the measuring device and the trailer coupling 9 along the intersection line C--C of FIG. 1a with a view to a normally horizontally aligned rotation plane eK, in which the coupling ball 21 is rotatable relative to the ball receptacle 11, wherein the distance between the poles S, N of the magnet 3 and the magnetic sensor 4 changes and the articulation angle wK resulting from the rotation can be measured. If the coupling ball 21 is rotated by +90°, the north pole N is located opposite the magnetic sensor 4, which delivers a voltage of 0V. If the coupling ball 21 is rotated by −90°, the south pole S is located opposite the magnetic sensor 4, which delivers a voltage of 5V. This means that articulation angles from +90° to −90° can be measured continuously.

FIG. 4 shows trailer 1 and the tractor vehicle 2 of FIG. 1c shown schematically as an arrow, which with their longitudinal axes xT and xZ enclose an articulation angle wK, according to which the wheels 16 were turned around the steering angle wS. This steering angle wS was selected so that trailer 1 follows the track of tractor vehicle 2. The steering angle wS can also be provided with an offset or deviation, e.g. in inclined terrain or at higher speeds, to compensate for lateral displacements. The wheels 16 of trailer 1 are equipped with a wheel suspension 15 for steerable wheels, as described for example in EP0193796A1. Alternatively or additionally, each wheel 16 can be assigned a braking device 17 which can be controlled by the control device 12 as well as an actuator 13 and a transmission line 14.

The invention claimed is:

1. A measuring device for measuring an articulation angle between a tractor vehicle having a first longitudinal axis and a trailer having a second longitudinal axis, the tractor vehicle and the trailer being coupled by a trailer coupling having a coupling ball and a ball receptacle adapted to receive the coupling ball, the measuring device comprising:
   a magnet mounted in a ball opening of the coupling ball; and
   at least one magnetic sensor mounted in a recess of the ball receptacle and adapted to detect changes in a magnetic field produced by the magnet;
   wherein a center of the magnet is positioned approximately at a center point of the coupling ball, such that the articulation angle is measured independently of tilting movements and rotations which occur about at least one of the first longitudinal axis and the second longitudinal axis.

2. The measuring device according to claim 1, wherein at least one of:
   the ball opening is a bore that passes completely or partially through the coupling ball; and
   the recess is a bore.

3. The measuring device according to claim 1, wherein:
   a third longitudinal axis extends between magnetic poles of the magnet and parallel to the first longitudinal axis of the tractor vehicle; and
   the magnet is aligned with the third longitudinal axis.

4. The measuring device according to claim 1, wherein dimensions of the magnet and a position of the magnet within the ball opening are such that a space remains between the poles of the magnet and an outer surface of the coupling ball.

5. The measuring device according to claim 1, wherein at least one of:
   the magnet and the ball opening have mutually corresponding threaded elements so that the magnet can be screwed into the ball opening; and
   a filler is provided inside the ball opening which holds the magnet and/or seals the ball opening.

6. The measuring device according to claim 1, wherein the coupling ball consists of a diamagnetic or paramagnetic material.

7. The measuring device according to claim 1, wherein the coupling ball and/or the ball receptacle comprises stainless steel.

8. The measuring device according to claim 1, wherein the recess of the ball receptacle has a fourth longitudinal axis which extends radially to a center of the coupling ball.

9. The measuring device according to claim 1, wherein the at least one magnetic sensor is arranged in such a way that, with coaxial alignment of the first and second longitudinal axes of the tractor vehicle and of the trailer, it is approximately equidistant from both poles of the magnet.

10. The measuring device according to claim 1, wherein the at least one magnetic sensor are two magnetic sensors which are each arranged in a recess of the ball receptacle.

11. The measuring device according to claim 1, wherein the at least one magnetic sensor is a Hall sensor.

12. A vehicle combination, comprising a tractor vehicle and a trailer, having a measuring device according to claim 1, wherein the at least one magnetic sensor is connected to a control unit, that the output signals of the at least one magnetic sensor can be processed in the control unit using a control program, and at least one actuator can be actuated as a function of the measured articulation angle, and that the at least one actuator is coupled via a force transmission unit to wheels of the tractor vehicle and/or trailer, or brake devices connected thereto.

13. The vehicle combination according to claim 12, wherein at least one pair of the wheels of the tractor vehicle and/or trailer is steerably suspended and controllable by means of the at least one actuator.

14. The vehicle combination according to claim 12, wherein at least one of the wheels of the trailer is assigned an individually actuatable braking device, that the braking device can be controlled by means of the at least one actuator.

* * * * *